Oct. 21, 1969  R. W. TABELING  3,473,382
BASE LINE SLOPE COMPENSATING CIRCUIT
Filed Jan. 10, 1967
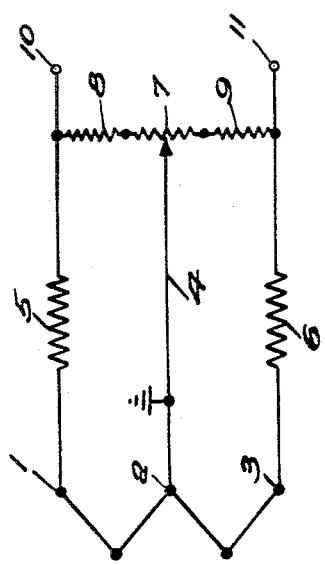
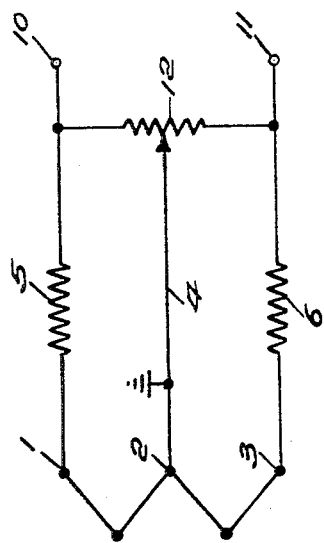
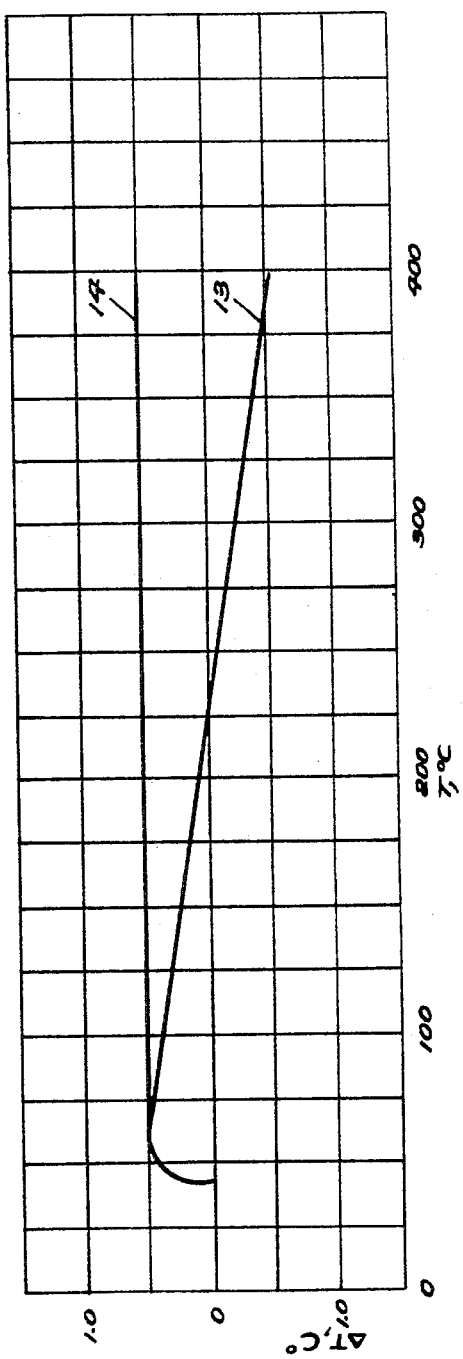
INVENTOR.
RAYMOND W. TABELING,
BY
AGENT

United States Patent Office

3,473,382
Patented Oct. 21, 1969

3,473,382
BASE LINE SLOPE COMPENSATING CIRCUIT
Raymond W. Tabeling, Wilmington, Del., assignor to E. I.
du Pont de Nemours and Company, Wilmington, Del.,
a corporation of Delaware
Filed Jan. 10, 1967, Ser. No. 608,293
Int. Cl. G01k 1/00, 3/00; G01n 25/00
U.S. Cl. 73—341                                 5 Claims

ABSTRACT OF THE DISCLOSURE

An electrical circuit for compensating for the base line slope of a thermogram, i.e., the deviation of the temperature difference of samples of the same reference material from a constant as a function of temperature, having a voltage divider bridged across the opposite leads of a pair of differential thermocouples with a variable center tap, for selectively loading the leads, connected to the common terminal of the pair of differential thermocouples.

Background of the invention

Differential thermal analysis (DTA) entails the measurement of the temperature difference ($\Delta T$) between a sample material under investigation and an inert reference material as the temperatures of both materials are simultaneously increased at a constant rate. Any endothermal or exothermal changes of the sample will cause its temperature to be lesser or greater, respectively, than that of the reference since the reference is inert. The difference is then recorded as a function of the sample, reference or furnace temperature.

When a thermogram is run in a DTA with reference material on both thermocouple systems, a zero $\Delta T$ should be developed as a function of temperature. Many times, in fact, this is not the case, due to differences in heat transfer rates into and out of the samples. Primarily, these differences are created by heat losses through the thermocouple leads. Great care must be exercised to critically balance the heat losses between the thermocouple leads. This is done generally by mechanical means, such as adjusting the distance of the heat sink away from one set of thermocouple leads to vary the heat loss through the lead.

Another method is to change the furnace position thereby altering the heat transfer into either the sample or the reference thermocouple. Both of these systems are highly empirical requiring a large amount of experimentation. As such, these methods entail inordinate time and effort and generally are unsuccessful.

Summary of the invention

An object of this invention is therefore to provide an electrical circuit for compensating for the base line slope of a thermogram induced by differences in heat transfer rates between the samples and their respective environments.

By utilizing an electrical circuit having a voltage divider therein bridged across the opposite ends of the differential thermocouples, with a variable center tap connected to the terminal common to the two thermocouples, the outputs of the respective differential thermocouples may be selectively loaded thereby compensating for heat transfer rate differences inducing the base line slope. By selecting the proper voltage divider center tap position the output of the DTA recorder will yield a thermogram of zero slope in a system utilizing the same reference sample for both differential thermocouples.

For a more detailed understanding of the invention, reference is made to the following description of two embodiments thereof and to the attendant drawing wherein:

FIGURE 1 is a schematic diagram of an electrical circuit incorporating one embodiment of the invention;

FIGURE 2, another form of the invention, is a modification of a portion of FIGURE 1; and FIGURE 3 is a graph illustrating the recorder output of a DTA system with and without the instant invention.

Referring to FIGURES 1 and 2, the sample thermocouple is connected between terminals 1 and 2 and the reference thermocouple between terminals 2 and 3. Terminal 2, being a common terminal to both thermocouples, is electrically connected to grounded center tap 4 of voltage dividers 7 and 12 in FIG. 1 and FIG. 2, respectively. In these embodiments the voltage dividers are potentiometers and the center tap is the wiper of the potentiometers. Outputs 10 and 11, electrically connected to terminals 1 and 3 via resistors 5 and 6, are connected to a high gain sensitive microvolt amplifier, typically called a thermocouple amplifier.

The electrical circuit in FIGURE 1 incorporates fixed resistors 8 and 9 between voltage divider 7 and the output terminals. An analogous electrical circuit is used in FIGURE 2 wherein voltage divider 12 has a resistive value equal to the sum of resistors 8 and 9 and voltage divider 7 in FIGURE 1.

Ideally, a thermogram should have a zero slope when both the sample and reference materials are the same. Therefore, to illustrate the present invention, this identity will be assumed.

Also, for convenience, only the embodiment in FIGURE 1 will be referred to in the following description. From this description the mode of operation of the functionally equivalent circuit shown in FIGURE 2 will be readily apparent.

When the sample and reference thermocouples are at ambient temperature, no potential is developed across resistors 5 and 6. Therefore, the position of voltage divider 7 is then immaterial. As the temperature of thermocouples 1–2 and 2–3 rise above ambient, currents are generated within each of these thermocouples developing potentials across their respective resistors 5 and 6.

Most of the current generated within each thermocouple is fed to the thermocouple amplifier via outputs 10 and 11. A portion of each current is shunted to ground via resistors 8 and 9 and voltage divider 7. By adjusting wiper 4 of voltage divider 7 the relative portions of thermocouple outputs shunted can be changed without changing the total output at outputs 10 and 11.

When the DTA system is first put into operation, both thermocouple systems are referenced to the same material. Due to inherent differences in the system, an initial $\Delta T$ will be generated. The temperature of the material is then varied, and if there is a change in the value of $\Delta T$ as the temperature changes, the position of the wiper on the voltage divider 7 is varied until no change in $\Delta T$ as a function of temperature is evident. This adjustment compensates proportionally as the thermocouple outputs increase. Since the error of base line slope increases linearly as a function of temperature this invention permits a direct single adjustment to compensate for this error. If the instrument is moved or altered in any way, however, the adjustment may have to be repeated.

This can best be shown by referring to FIGURE 3 wherein curve 13 is a thermogram of a DTA system, without the compensating circuit and curve 14 is a thermogram of the same system with the circuit. The instant invention does not purport to obviate either the initial upset or the subsequent constant $\Delta T$ offset (about .5° C. for this system) created in going from a steady to a transient state but only compensates for the nearly constant slope of curve 13.

The aforemenioned DTA system embodies an air atmosphere, chromel-alumel thermocouples and a reference material of inert material which is progressively heated from a 43° C. ambient temperature to about 400° C. at a rate of 10° C. per minute. The embodiment of FIGURE 1 with resistors 5, 6, 8 and 9 and voltage divider 7 being 100, 100, 47K, 47K, and 50K ohms, respectively, was in corporated in the DTA system to produce curve 14. By running a DTA, the deviation from zero can be noted. Then by proper setting of wiper 4, a thermogram having a zero slope in a fully transient state can be obtained as shown by FIGURE 3.

This design of the base line slope compensating circuit has a maximum span of adjustment of about 1° C. in 1,000° C. By changing the resistor values the circuit can be made to compensate for a greater or lesser deviation in base line slope.

The use of the base line compensating circuit enables utilization of higher sensitivities on the $\Delta T$ axis without having the recording run off scale which would require re-zeroing by the operator. A straight, level base line also makes it possible to more easily interpret the peaks that are generally recorded when a sample is used in DTA.

It will be understood that various changes in the details, materials, steps and arrangement of parts, which have been herein described and illustrated in order to explain the nature of the invention, may be made by those skilled in the art within the principle and scope of the invention.

What is claimed is:

1. In a differential thermal analysis system comprising a first and second temperature responsive means, each having one of their output leads electrically joined at a common terminal; the improvement comprising a voltage dividing means electrically connected across the unjoined output leads of the temperature responsive means, said voltage dividing means having a variable center tap, for selectively loading the output of one of said first and second temperature responsive means, which center tap is connected to said common terminal.

2. The improvement of claim 1 wherein said voltage dividing means is a potentiometer and said center tap is the wiper of said potentiometer.

3. The improvement of claim 2 wherein said wiper is connected to ground.

4. The improvement of claim 1 further comprising resistors incorporated in the leads of said temperature responsive means between said first and second temperature responsive means and said voltage dividing means.

5. The improvement of claim 1 wherein said first and second temperature responsive means are thermocouples.

References Cited

UNITED STATES PATENTS

| | | | |
|---|---|---|---|
| 2,696,119 | 12/1954 | Jones | 73—360 |
| 3,218,859 | 11/1965 | McBride | 73—341 |

LOUIS R. PRINCE, Primary Examiner

D. E. CORR, Assistant Examiner

U.S. Cl. X.R.

73—15